Feb. 2, 1965 N. T. MILLER 3,167,991
ROTARY CUTTER ASSEMBLY
Filed Feb. 21, 1962

INVENTOR.
NORMAN T. MILLER
BY
Malcolm W. Fraser
ATTORNEY

United States Patent Office 3,167,991
Patented Feb. 2, 1965

3,167,991
ROTARY CUTTER ASSEMBLY
Norman T. Miller, 3412 Muirfield Drive, Toledo, Ohio
Filed Feb. 21, 1962, Ser. No. 174,876
1 Claim. (Cl. 83—662)

This invention relates to rotary cutters for use for example in cutting fiber glass sheet or ribbon into predetermined shapes.

Fiber glass is used extensively for insulation purposes and not infrequently a mat of a certain shape provided with cut-outs and irregularities, such as notches, is employed in large quantities for the insulating of refrigerators, stoves, and various appliances. To make reciprocitory dies for the purpose is easy and inexpensive, however, the operation of stamping is costly. Furthermore the packaging of a quantity of flat insulation pieces is bulky and space consuming and they do not lend themselves to compact packages for shipment and storage.

In accordance with this invention a simple and efficient rotary cutter is produced which can be readily converted to make insulating pieces of fiber glass of different shapes and sizes so that the same assembly can be altered in a short time and at slight expense to produce different shapes. The very nature of the rotary operation enables an endless strip of fiber glass mat to be used which can be rerolled after the cutting operation, sufficient connecting portions between adjacent pieces being maintained to provide a continuous strip. This enables the user to unwind from a roll as many insulation pieces as desired and simplifies the storage problem.

One object is therefore to produce a new and improved rotary cutter for glass fiber mats or the like which can be readily and conveniently assembled.

Figure 1:
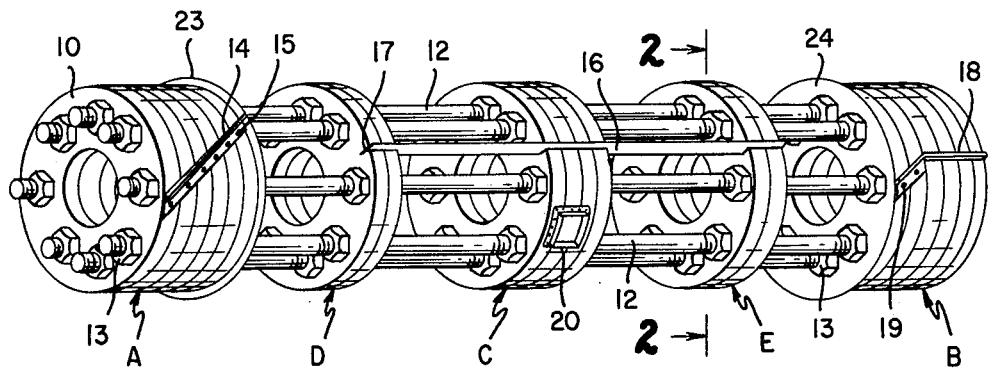
Figure 2:
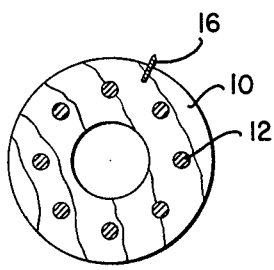
Figure 3:
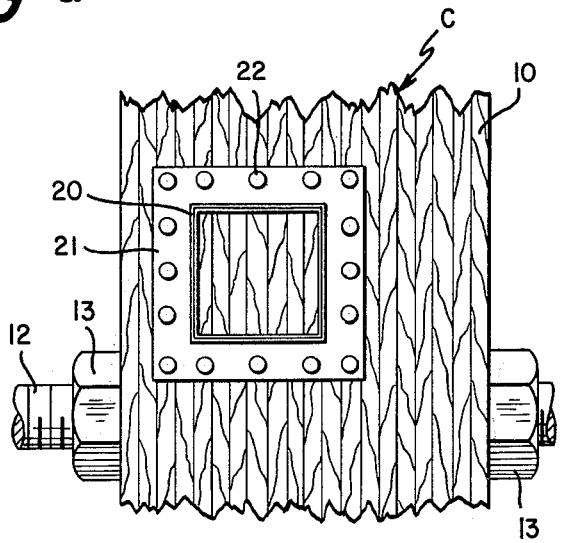

Other objects and advantages of the invention will hereinafter appear and, for purposes of illustration but not of limitation, an embodiment of the invention is shown on the accompanying drawings in which FIGURE 1 is a perspective view of the rotary cutter;
FIGURE 2 is a sectional view substantially on the line 2—2 of FIGURE 1; and
FIGURE 3 is an enlarged fragmentary elevation of one of the groups of annuli showing a square cutter mounted thereon.

The illustrated embodiment of the invention comprises a rotary cutter made up essentially of a plurality of plywood annuli 10, each being provided with a central hole 11, it being understood that at opposite ends of the cutter driving mandrels (not shown) may be employed to support and impart rotation to the cutter.

As shown the plywood annuli 10 are arranged in groups. At opposite ends are groups A and B, each of which is made up of six plywood annuli. In this instance each annulus 10 is formed of a five ply arrangement, although this may be varied in accordance with the prevailing conditions. Manifestly plywood lends itself very satisfactory in this instance for several reasons. It has dimensional stability. It is relatively light in weight and enables the cutters to be readily mounted thereon as will hereinafter appear.

In this instance there is a center group C of annuli and this group is composed of four annuli.

Disposed between the center groups C and the end groups A and B are intermediate groups D and E arranged in spaced relation to the adjacent groups.

Each annulus has a circular row of holes and the holes of the various annuli are similarly arranged. In this instance 8 holes are provided and extending through these aligned holes of the several annuli are steel rods 12 which preferably are screw threaded throughout their length. A quantity of nuts 13 are employed for each of the rods 12. For example, nuts are disposed at the outer end of group A and another set at the inside of this group thereby to clamp these annuli together. Similarly nuts are provided on opposite sides of the group B for holding these annuli together and in properly spaced relation to the groups A and C. Thus it will be apparent that the several groups of annuli are firmly held in place on the rods 12 by nuts 13 disposed on opposite sides of each group.

A plurality of cutters are carried by the several groups of annuli but it will be understood that the arrangement of these cuttting instrumentalities will vary in accordance with the desired shape of the ultimate piece. In this instance a diagonally arranged knife 14 is carried by the group A and this constitutes an L-shaped metallic piece, the flange of which is secured to the peripheral surface of the adjacent annuli by a series of screws or nails 15.

A longitudinally extending knife 16 disposed generally parallel to the screw threaded rods 12 has an inner portion wedged into notches 17 formed in the annuli respectively of the groups D, C and E.

An angled knife 18 is carried by the end group B, a portion of this knife being wedged into notches in certain of the anuli and another portion has a flanged portion abutting the peripheral surface of two of the annuli and nails 19 secure the flange in place.

Carried by the central group C is a square cutter 20 which has integral flanges 21 which project outwardly and are secured to the peripheral surface of the annuli by a series of nails 22.

For trimming the glass fiber mat longitudinally are curvilinear knives 23 and 24 which have holes receiving the rods 12, nuts 13 clamping these knives in place. As shown a portion of the cutting edge projects outwardly from the adjacent groups of annuli A and B respectively.

From the above it will be manifest that the particular arrangement of cutters above described is illustrative and numerous changes in arrangement and selection of these cutters will be made in accordance with the shape and cut-outs desired in the finished piece of insulation. It will be understood that the size of the groups can be varied as desired and their spacing one from the other can be changed. The mounting of the cutters can be quickly achieved without difficulty. The circumference of the die in most cases is the length of the piece or in increments of the length. One advantage of this concept is that the insulation user can tear off different size pieces which constitute a set for a given job and they can be so arranged as to be in the order of their use. Also if there is to be an adhesive applied to one face of the insulation the insulation can be pulled from the roll but not pulled apart in the necessary pieces until after it is sprayed. This minimizes production handling and reduces messy and costly overspray of the adhesive.

Numerous changes in details of construction, arrangement and choice of materials may be effected without departing from the spirit of the invention especially as defined in the appended claim.

What I claim is:

A rotary cutter assembly for cutting glass fiber mats or the like comprising a plurality of plywood discs arranged in predetermined groups spaced laterally from each other, the discs being formed with annular rows of holes registering respectively with each other, screw threaded rods extending through the registering holes in the discs, nuts on said rods arranged on opposite sides of the respective groups of discs, the rods and nuts constituting the sole means for retaining the discs in position and providing a self sustaining assembly, horizontal notches in certain adjacent groups of discs, a knife blade wedged into said notches and spanning the space between such groups, and other knife blades secured directly to the peripheral surfaces of the discs.

References Cited in the file of this patent

UNITED STATES PATENTS

| | | | |
|---|---|---|---|
| 1,323,425 | Townsend | Dec. 2, | 1919 |
| 1,730,006 | Harrold | Oct. 1, | 1929 |
| 2,257,336 | Feurt | Sept. 30, | 1941 |

FOREIGN PATENTS

| | | | |
|---|---|---|---|
| 18,120 of 1891 | Great Britain | Oct. 22, | 1891 |
| 161,744 | Great Britain | Apr. 21, | 1941 |